United States Patent
Wong et al.

(10) Patent No.: US 8,073,859 B2
(45) Date of Patent: Dec. 6, 2011

(54) SEQUENTIAL PATTERN DATA MINING AND VISUALIZATION

(75) Inventors: Pak Chung Wong, Richland, WA (US); Elizabeth R. Jurrus, Kennewick, WA (US); Wendy E. Cowley, Benton City, WA (US); Harlan P. Foote, Richland, WA (US); James J. Thomas, Richland, WA (US)

(73) Assignee: Battelle Memorial Institute, Columbus, OH (US)

(*) Notice: Subject to any disclaimer, the term of this patent is extended or adjusted under 35 U.S.C. 154(b) by 40 days.

(21) Appl. No.: 12/436,391

(22) Filed: May 6, 2009

(65) Prior Publication Data

US 2009/0271406 A1     Oct. 29, 2009

Related U.S. Application Data

(62) Division of application No. 09/972,081, filed on Oct. 8, 2001, now Pat. No. 7,539,677.

(60) Provisional application No. 60/239,334, filed on Oct. 9, 2000.

(51) Int. Cl.
*G06F 7/00* (2006.01)
*G06F 17/30* (2006.01)

(52) U.S. Cl. ........................................ 707/758; 345/588
(58) Field of Classification Search .......... 707/600–831; 715/848–851; 345/419, 588, 641
See application file for complete search history.

(56) References Cited

OTHER PUBLICATIONS

Joshi et al., A universal formular of sequential patterns, May 20, 1999, Google, 1-17.*
Keim et al., Recursive pattern: a technique for visualizing very large amounts of data, 1995, IEEE, 279-286.*
Agrawal et al., Mining sequential patterns, 1995, IEEE, 3-14.*
A Roy et al., Novel techniques of graphical representation and analysis of DNA sequences—A review, Mar. 1998, Google, 55-71.*

* cited by examiner

*Primary Examiner* — Jean B Fleurantin
(74) *Attorney, Agent, or Firm* — Woodard, Emhardt, Moriarty, McNett & Henry LLP

(57) ABSTRACT

One or more processors (22) are operated to extract a number of different event identifiers therefrom. These processors (22) are further operable to determine a number a display locations each representative of one of the different identifiers and a corresponding time. The display locations are grouped into sets each corresponding to a different one of several event sequences (330a, 330b, 330c. 330d, 330e). An output is generated corresponding to a visualization (320) of the event sequences (330a, 330b, 330c, 330d, 330e).

13 Claims, 9 Drawing Sheets

- ☑ bavarian
- ☑ beryllium
- ☑ bnd
- ☑ container
- ☑ containers
- ☑ customs
- ☑ czech
- ☑ devices
- ☑ factory
- ☑ fbi
- ☑ fuel
- ☑ heu
- ☑ iaea
- ☑ ignalina
- ☑ john
- ☑ lebed
- ☑ lithuanian
- ☑ mercury
- ☑ novosibirsk
- ☑ pellets
- ☑ plutonium
- ☑ programs
- ☑ red
- ☑ romaina
- ☑ schmidbauer
- ☑ seized
- ☑ suitcase
- ☑ torres
- ☑ united

*Fig. 9*

SEQUENTIAL PATTERN DATA MINING AND VISUALIZATION

CROSS-REFERENCE TO RELATED APPLICATIONS

The present application is a divisional of U.S. Ser. No. 09/972,081 filed Oct. 8, 2001 now U.S. Pat. No. 7,539,677 which claims the benefit of commonly owned U.S. Provisional Patent Application No. 60/239,334, filed 9 Oct. 2000, both of which are hereby incorporated by reference in their entireties. This application is also related to commonly owned U.S. Ser. No. 09/695,157, filed 24 Oct. 2000 and issued as U.S. Pat. No. 6,711,577, which is also incorporated by reference.

GOVERNMENT RIGHTS

The U.S. Government has a paid-up license in this invention and the right in limited circumstances to require the patent owner to license others on reasonable terms as provided for by contract no. DE-AC06-76RLO 1830 awarded by the U.S. Department of Energy.

BACKGROUND

The present invention relates to data processing and more particularly, but not exclusively, relates to the discovery and visualization of sequential patterns.

The task of sequential patterns in knowledge discovery and data mining is to identify an item that frequently precedes another item. Generally a sequential pattern can be described as a finite series of elements. A four-element sequential pattern can be represented as A→B→C→D; where A, B, C, and D are elements of the same domain. A nonlimiting example of a sequential pattern is: "90% of the die-hard fans who saw the movie Titanic went on to buy the movie sound track CD, followed by the videotape when it was released." Using the above notation, this sequential pattern example can be more generally represented as: A→B→C; where A="saw the movie", B="buy CD", and C="buy video tape," where A→B→C has a support of 90%.

In contrast, an association rule is an implication of the form X→Y where X is a set of antecedent items and Y is the consequent item. For the given elements A, B, C, and D of a common domain, A+B+C→D is an example of an association rule. An association rule is a study of "togetherness" of elements, whereas a sequential pattern is a study of the "ordering" or "arrangement" of elements. Further background information about association rule data mining can be found in Pak Chung Wong, Paul Whitney and Jim Thomas, "Visualizing Association Rules for Text Mining" *Proceedings of IEEE Information Visualization*, (published by IEEE CS Press) (dated 26 Oct. 1999).

Frequently, one goal of sequential pattern discovery is to assess the evolution of events against a measured timeline and detect changes that might occur coincidentally. This information can be used to detect medical fraud in insurance claims, evaluate drug performances in pharmaceutical industry, determine risk factors in military operations, and/or develop retail sales trends for marketing purposes, just to name a few. Further general background information about sequential patterns can be found in U.S. Pat. Nos. 6,006,223; 5,819,266; and 5,742,811 to Agrawal et al; and in Rakesha Agrawal and Ramakrishnan Srikant, "Mining Sequential Patterns," *Proceedings of the International Conference on Data Engineering (ICDE)*, (dated March 1995).

As more powerful processors and larger datasets become available, the ability to effectively recognize and utilize sequential patterns becomes more difficult. Accordingly, new strategies are needed to identify and present sequential pattern information. The present invention addresses such needs.

SUMMARY

One embodiment of the present invention includes a unique data processing technique. Other embodiments include unique methods, systems, devices, and apparatus for data processing.

A further embodiment of the present invention includes: extracting a number of different topics from a dataset with a computer; providing an arrangement of the different topics relative to time of occurrence with the computer; determining a number of topic sentence patterns from the arrangement with the computer; and providing an output corresponding to a visualization of the topic sequence patterns with the computer.

Another embodiment of the present invention includes evaluating a dataset with a computer to determine a number of sequence patterns. A visual representation of the sequence patterns is provided with the computer and a number of visual indications are displayed in this representation. The visual indications each correspond to a level of support for a respective one of the sequence patterns.

Still another embodiment includes: generating a visualization with a computer representative of several event sequences; displaying one of the event sequences more than once in the visualization to correspondingly represent occurrences of one of the event sequences at different times; and displaying three or more of the event sequences that overlap in time in the visualization.

Yet further embodiments of the present invention include systems, apparatus, and devices operable to perform and/or implement the above-indicated embodiments, among others.

One object of the present invention is to provide a unique data processing technique.

Another object of the present invention is to provide a unique method, system, device, or apparatus for data processing.

Further embodiments, forms, features, aspects, benefits, objects, and advantages shall become apparent from the detailed description and figures provided herewith.

BRIEF DESCRIPTION OF THE VIEWS OF THE DRAWING

FIG. 9 is a schematic view of a Graphic User Interface (GUI) selection window associated with the visualization of FIG. 8.

DETAILED DESCRIPTION

Figure 1:
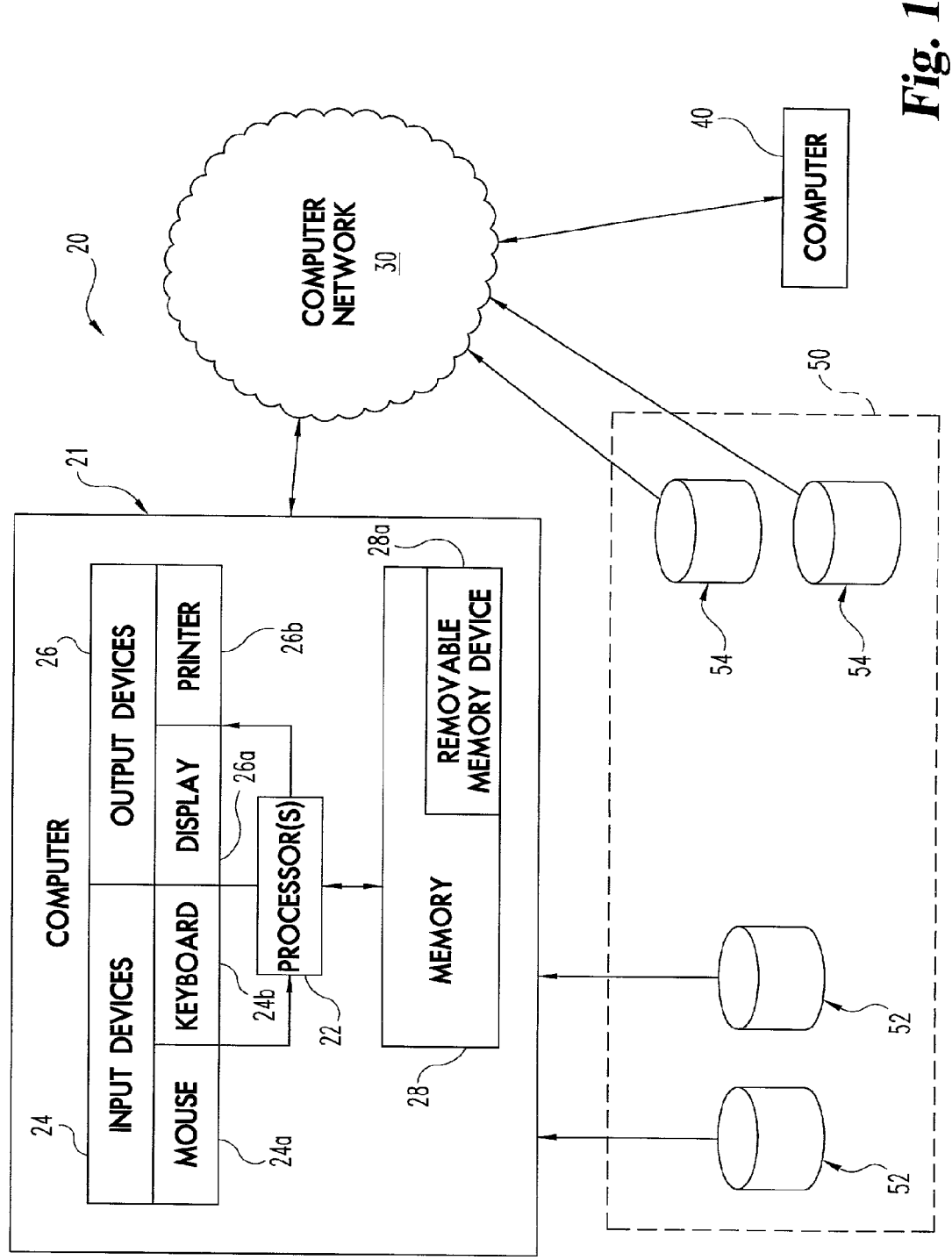
FIG. 1 is a diagrammatic view of a computing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention is a unique technique to discover sequential patterns from a computer-accessible dataset. This technique can include a unique data mining approach to identify sequential patterns and/or a unique way of visualizing sequential patterns. In further embodiments, various unique systems and apparatus are provided. By way of nonlimiting example, FIG. 1 diagrammatically depicts computer system 20 of one embodiment of the present invention.

System 20 includes computer 21 with one or more computer processor(s) 22. processor(s) 22 can be of any type. System 20 also includes operator input devices 24 and operator output devices 26 operatively coupled to processor(s) 22. Input devices 24 include a conventional mouse 24a and keyboard 24b, and alternatively or additionally can include a trackball, light pen, voice recognition subsystem, and/or different input device type as would occur to those skilled in the art. Output devices 26 include a conventional graphic display device 26a and color printer 26b, and alternatively or additionally can include an aural output system, and/or different output device type as would occur to those skilled in the art. Further, in other embodiments, more or fewer operator input devices 24 or operator output devices 26 may be utilized.

System 20 also includes memory 28 operatively coupled to processor(s) 22. Memory 28 can be of one or more types, such as solid-state electronic memory, magnetic memory, optical memory, or a combination of these. As illustrated in FIG. 1, memory 28 includes a removable/portable memory device 28a that can be an optical disk (such as a CD ROM or DVD); an electromagnetically encoded hard disk, a floppy disk, tape, or cartridge media; or a different form as would occur to those skilled in the art. In one embodiment, at least a portion of memory 28 is operable to store programming instructions for processor(s) 22. Alternatively or additionally, memory 28 can be arranged to store data other than programming instructions for processor(s) 22. In still other embodiments, memory 28 and/or portable memory device 28a may not be present. In one such example, a hardwired state-machine configuration of processor(s) 22 does not utilize memory-based instructions.

System 20 also includes computer network 30 that can include a Local Area Network (LAN); Wide Area Network (WAN), such as the Internet; another type as would occur to those skilled in the art; or a combination of these. Network 30 couples computer 40 to computer 21; where computer 40 is remotely located relative to computer 21. Computer 40 can include one or more processor(s), input devices, output devices, and/or memory as described in connection with computer 21; however these features of computer 40 are not shown to preserve clarity of FIG. 1.

Computer 40 and computer 21 can be arranged as client and server, respectively, in relation to some or all of the data processing of the present invention. For this arrangement, it should be understood that many other remote computers 40 could be included as clients of computer 21, but are not shown to preserve clarity. In another embodiment, computer 21 and computer 40 can both be participating members of a distributed processing arrangement utilizing at least one processor of each site. The distributed processors of such an arrangement can be used collectively to execute routines according to the present invention. In still other embodiments, remote computer 40 may be absent.

Figure 2:
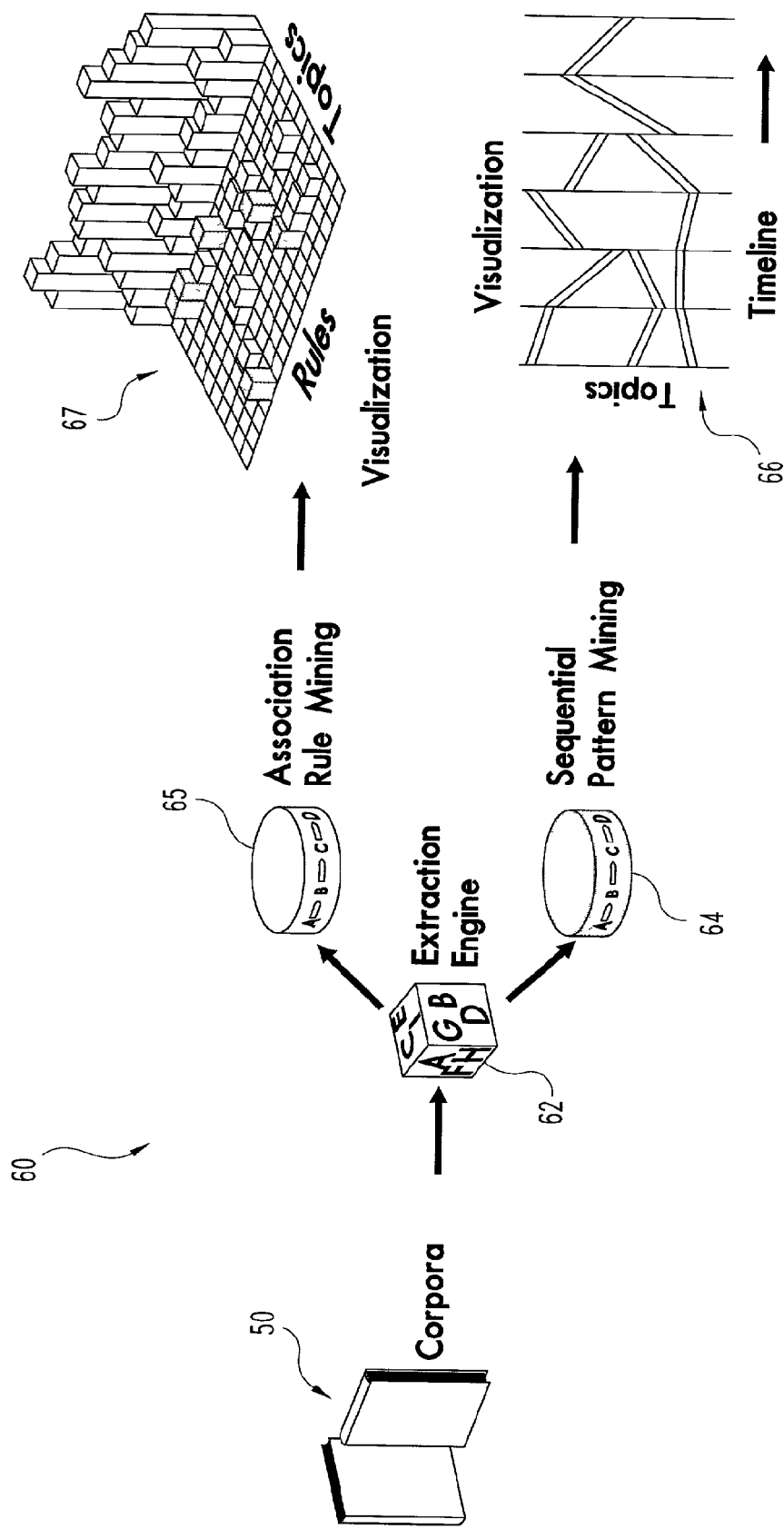
FIG. 2 is a diagrammatic view of various data processing components of the system of FIG. 1.

System 20 is also depicted with computer-accessible data sources or datasets generally designated as corpora 50. Corpora 50 includes datasets 52 local to computer 21 and remotely located datasets 54 accessible via network 30. Computer 21 is operable to process data selected from one or more of corpora 50. Referring additionally to FIG. 2, system 20 is defined in terms of selected conceptual data processing components 60. The one or more corpora 50 can be accessed with data extraction engine 62 to selectively extract information according to predefined criteria. Results obtained with extraction engine 62 are submitted to sequential data mining engine 64 and/or association rule data mining engine 65. The data mined with engines 64 or 65 is processed to provide a visualization output 66 or 67, respectively. Engines 62, 64, and 65 can be defined through corresponding programming/logic of processor(s) 22 of system 20. Processor(s) 22 can also be arranged to provide a graphic display corresponding to visualization output 66 or 67 with one or more of output devices 26 and/or transmit visualization output 66 or 67 over computer network 30.

Figure 3:
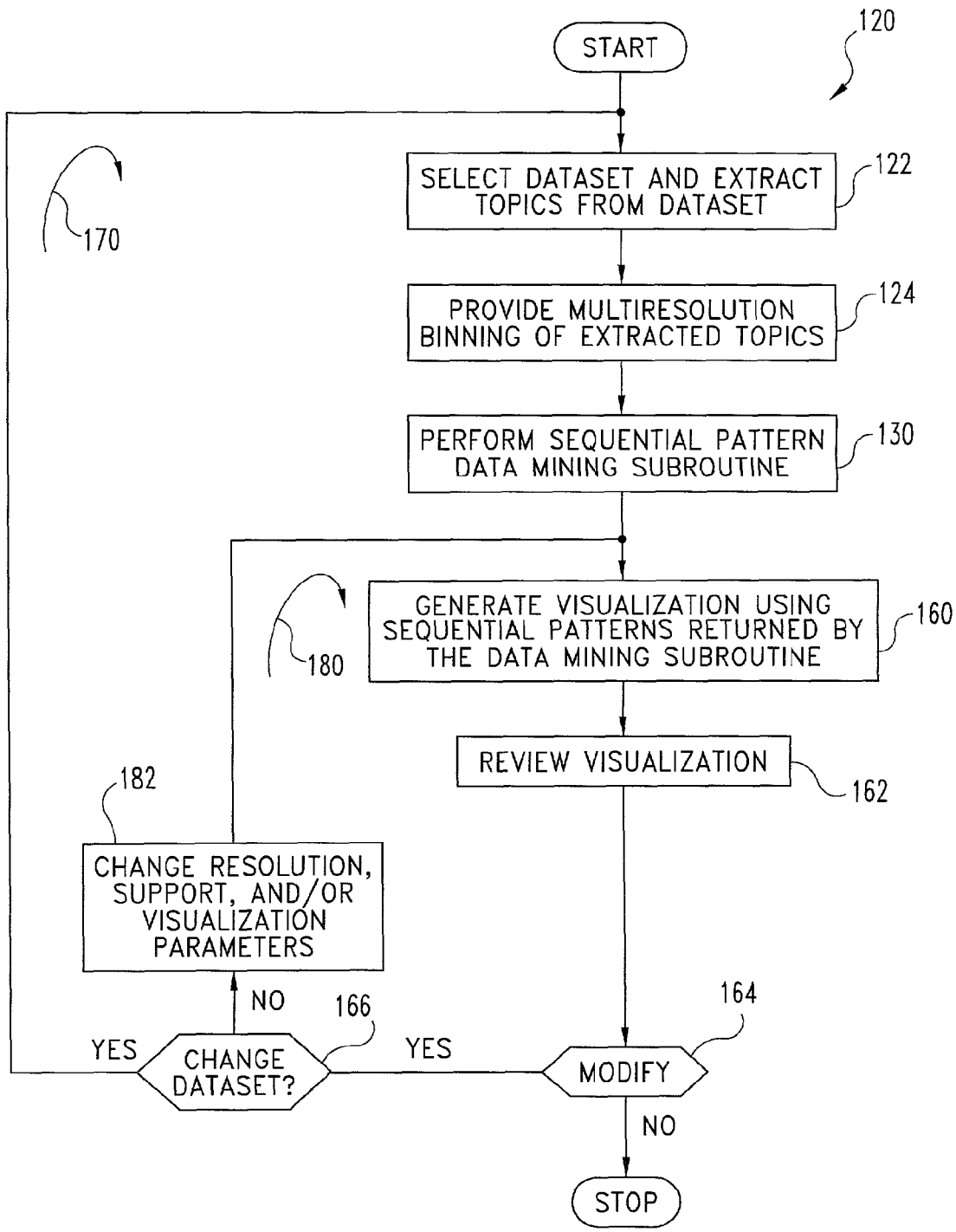
FIG. 3 is a view of a flowchart illustrating details of a data processing routine that can be executed with the system of FIG. 1.

Next, features of the present invention more specifically directed to sequential pattern discovery and visualization are described. Referring to FIG. 3, a flowchart of data processing routine 120 for mining and visualizing sequential patterns is depicted. Routine 120 represents one nonlimiting way in which engines 62 and 64 can be implemented. In stage 122 of routine 120, a dataset is selected for processing from the available corpora 50. Topics of interest are extracted from the selected dataset in correspondence to the previously described extraction engine 62. In one text-based dataset example, a medium-sized corpus (~1 MB) was accessed to extract a set of content-bearing words. This corpus was stored as an ASCII file with about 1,170 articles collected from 1991 to 1997, and has a strong theme associated with nuclear smuggling news throughout the 1990s. For such text-based examples, words separated by white spaces in a corpus can be evaluated within the context of the corpus to assess whether a word warrants inclusion as a topic. In one embodiment, Bookstein's techniques regarding identification of content-bearing words are used to assess the relative contribution of a word to the content of the corpus. These techniques are further described in A. Bookstein, S. T. Klein, and T. Raita, "Clumping Properties of Content Bearing Words," *Journal of the American Society for Information Science*, 49(2), pp. 102-114 (dated 1998). The co-occurrence or lack of co-occurrence of candidate topic words in documents is used to evaluate the strengths of the words. Stemming is used to remove suffixes so that similar words are represented by the root word. Commonly appearing words that do not directly contribute to the content—such as prepositions, pronouns, adjectives, and gerunds—are ignored. The result is a set of content-bearing words that represent the major topics (or themes) of the corpus.

Routine 120 proceeds from stage 122 to stage 124 to chronologically index the extracted topics based on a range of consecutive time intervals. This chronological ordering can also be considered a part of the operation of extraction engine 62. Through this procedure, topics that occur in the same time interval are indexed or "binned" together, where as topics occurring in different time intervals are placed in different indexes or data bins. Collectively, the ordered topics comprise an input data set for subsequent processing. Time-stamp grouping represents the highest available resolution of the topics with respect to time, and can be by any time increment such as minutes, hours, days, weeks, months, years, etc. . . . For the previously described news corpus example, a daily time stamp was used. From such daily topic bins, lower resolutions can be derived in terms of longer time intervals, such as weeks, months, or years. Accordingly, for the news corpus, topic patterns of the news stories are captured that span different time intervals such as days, weeks, months, or years.

Indeed, different sequential patterns may emerge based on the selected resolution. When identifying a sequential pattern, a break in the input data can be treated as a break in the pattern. With this approach, the pattern A→B→C that occurs over three consecutive days could be identified from extraction topics collected with a daily resolution; whereas the pattern would not be recognized using a coarser weekly resolution. On the other hand, the pattern A→B→C that occurs over three consecutive weeks with breaks of a day or more between two or more of the elements A, B, and C would not be identified as a pattern using a daily resolution; however, the pattern would emerge with application of the coarser weekly resolution. Thus, by evaluating the extracted topics at different time resolutions, different patterns can frequently be detected. In one form, stage 124 is further arranged to accept a resolution selection input via one or more of operator input devices 24 to designate the desired resolution for subsequent processing of the extracted topics.

From stage 124, routine 120 proceeds to the subroutine 130 which corresponds to data mining engine 64. Generally, in subroutine 130 pattern structures are built using an "n"-ary tree with "n" branches, also known as a "trie" in the study of computer algorithms. Each node of this tree represents an element, i.e., an extracted topic in this case, of the pattern sequences. The pattern is a valid pattern if its support value is larger than a predefined threshold value. The support value is calculated as the number of occurrences of the pattern in the dataset. A pattern is determined by examining element sequences in the extracted topic input dataset; where a break in the dataset of one time interval or more represents a break in the pattern, correspondingly terminating it.

Figure 4:
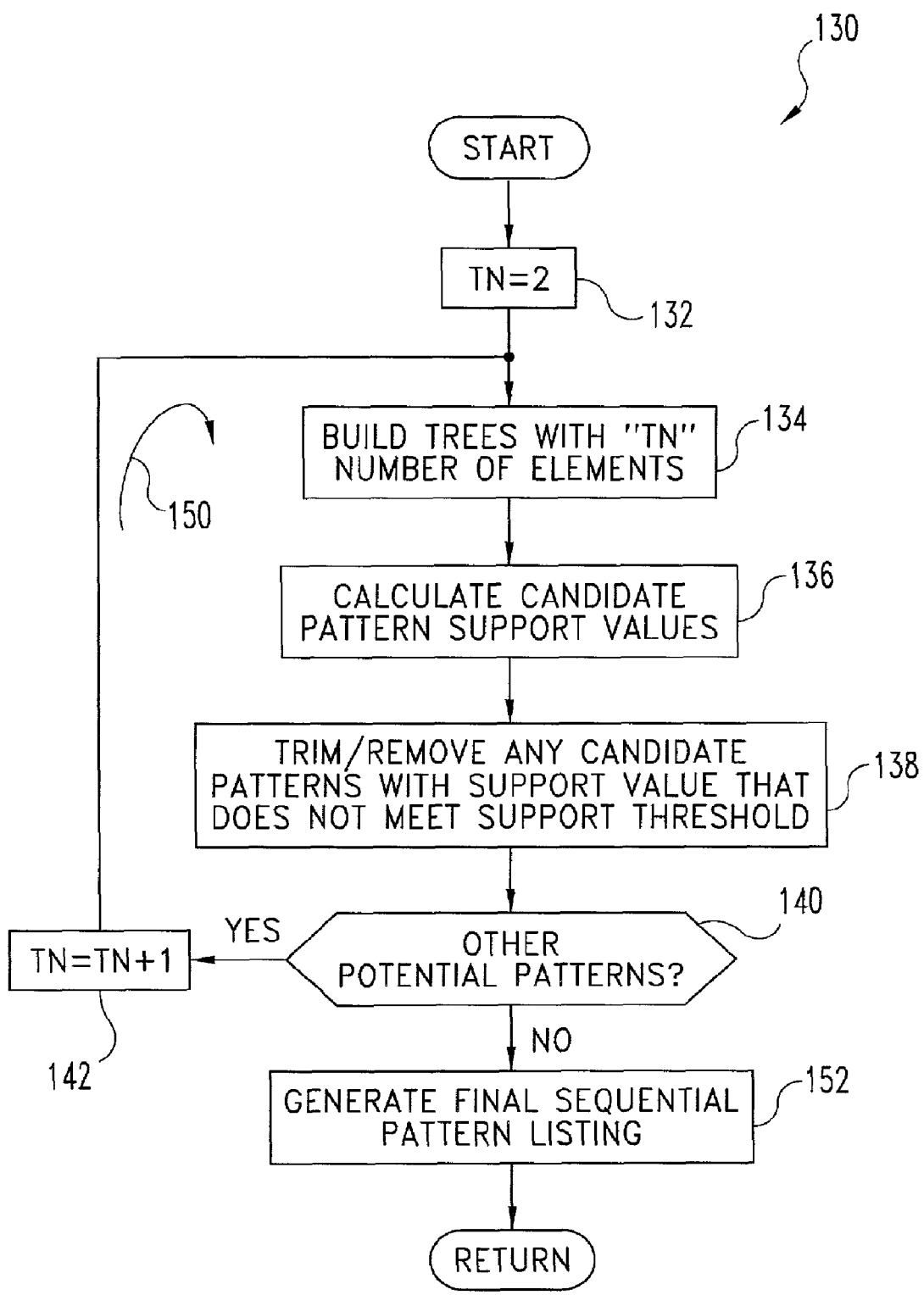
FIG. 4 is a view of a flowchart providing further details about the sequential pattern data mining subroutine of FIG. 3.
Figure 5:
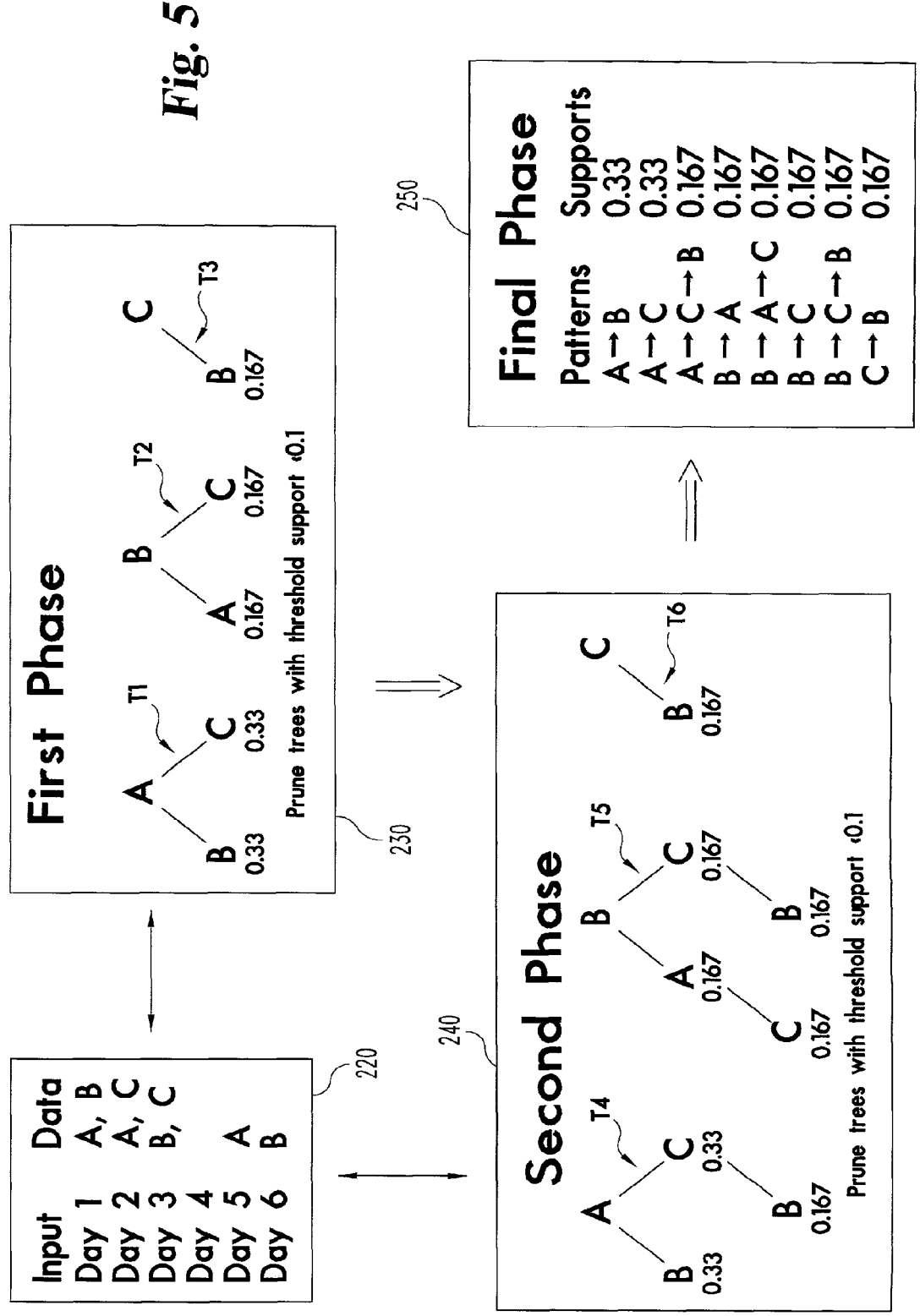
FIG. 5 provides a view that schematically illustrates one example of an application of the subroutine of FIG. 4.

Referring to FIG. 4, further details concerning subroutine 130 are illustrated. In stage 132 of routine 130, a topic number index "TN" is initialized to two (TN=2), corresponding to an initial formation of all two-topic patterns into corresponding trees. From stage 132, stage 134 is encountered in which the TN-topic trees are built. Referring also to FIG. 5, a basic example of mining sequential patterns of a corpus with a topic domain of {A, B, C} within a 6-day period is shown. The daily topic input data set for this six day period is depicted in the upper left-hand corner of FIG. 5 in data block 220 with time interval bins indexed in the "Input" column and the ordered topic elements in the "Data" column. In this example, a "First Phase" operation block 230 is also depicted that includes three trees T1, T2, and T3, each being of the two-topic type (TN=2). Trees T1, T2, and T3 were formed in accordance with stage 134. An example of a two-topic pattern determined in the First Phase is the pattern A→B that happens in Day 2 to Day 3 and Day 5 to Day 6. A total of five patterns (branches) for trees T1, T2, and T3 are depicted under the First Phase of the FIG. 5 example.

Subroutine 130 proceeds from stage 134 to stage 136. In stage 136, the support value of each pattern created in stage 134 is calculated as the ratio of the number of occurrences of each different TN-element pattern in the dataset to the total number of records. In the case of the A→B pattern for the FIG. 5 example, the number of occurrences is 2 and the total number of records is 6, resulting in a support of $2/6=1/3$ (represented in FIG. 5 by the approximation of 0.33). The support values of each observed pattern in block 230 are shown below a respective pattern node, which from left to right are 0.33, 0.33, 0.167, 0.167, and 0.167.

Next, stage 138 is encountered that prunes or trims away (removes) any patterns with support values that do not exceed a predetermined support threshold. For the FIG. 5 example, the support threshold is set to 10% or 0.1. Because an n-topic sequential pattern must have the same or higher support than any patterns with the same n leading topics, the leaves of a tree can be removed as soon as they fail the threshold test. For the FIG. 5 example, the two-topic pattern A→C appears at least as often as any patterns with the same two leading topics such as A→C→B. If the support of A→C is below the threshold, the support of A→C→B will only be the same or lower.

Subroutine 130 then proceeds to conditional 140 that tests if there are any other potential patterns after the trimming operation of stage 138. If there are, the affirmative branch of conditional 140 proceeds to stage 142 to increment TN by one (TN=TN+1). Subroutine 130 proceeds from stage 142 to stage 134, forming processing loop 150 to once again execute stages 134, 136, 138, and conditional 140 with the number of candidate pattern elements now being three (TN=3). The execution of loop 150 with TN=3 corresponds to the illustrated "Second Phase" operation block 240 of the FIG. 5 example. In the Second Phase, the qualified (remaining) 2-topic patterns are matched with the input data from block 220 during the execution of stage 134 to generate any corresponding three-element patterns. The results of the execution of stage 134 with TN=3 are depicted as trees T4, T5, and T6 in FIG. 5. Corresponding support values are calculated in stage 136 as shown below a respective node of each sequential pattern represented by trees T4, T5, and T6. Next, another round of threshold pruning is performed in stage 138 for TN=3. Conditional 140 is then encountered to again test if further patterns exist, incrementing TN in stage 142 and returning to stage 134 via loop 150 if affirmative.

Once all the candidate patterns have been found, the test of conditional 140 is negative, and subroutine 130 proceeds to stage 152. In stage 152, the resulting sequential patterns and corresponding support values are designated, and subroutine 130 then returns to routine 120. For the FIG. 5 example, after the Second Phase, there are no more possible patterns. Accordingly, the test of conditional 140 is negative, and stage 152 is encountered, which generates the sequential pattern results for the FIG. 5 example. These sequential pattern results are depicted under the "Final Phase" operation block 250 of FIG. 5. In one example, the pattern A→C happens in Day 1 to 2 and Day 2 to 3; and the support is $2/6=0.33$. In another example, the pattern A→C→B only happens once; and the support is $1/6=0.167$. It should be appreciated that for the FIG. 5 example, single-lined, double-headed arrows extending from data block 220 correspond to data referenced by operation blocks 230 and 240, and the double-lined, single-headed arrows between operation blocks 230, 240, and 250 correspond to the progression of data mining subroutine 130.

In general, the process represented by loop 150 of subroutine 130 is repeated with a new topic appended to the previously qualified patterns until the input data are exhausted, as tested by conditional 140. Indeed, for many data mining applications, it is expected that loop 150 could be repeated more times than for the FIG. 5 example, such that TN is greater than three (TN>3).

Referring back to FIG. 3, routine 120 proceeds from subroutine 130 to stage 160. In stage 160, a visualization output is generated that corresponds to the sequential patterns mined with subroutine 130. In one form, this visualization output is arranged to provide a graphical representation of each of the sequential patterns identified with subroutine 130. Furthermore, visualization output can optionally be arranged to provide an indication of relative strength of the visualized pattern sequences. Visualization output 66 of FIG. 2 is representative of one form of the output generated in stage 160.

Figure 6:
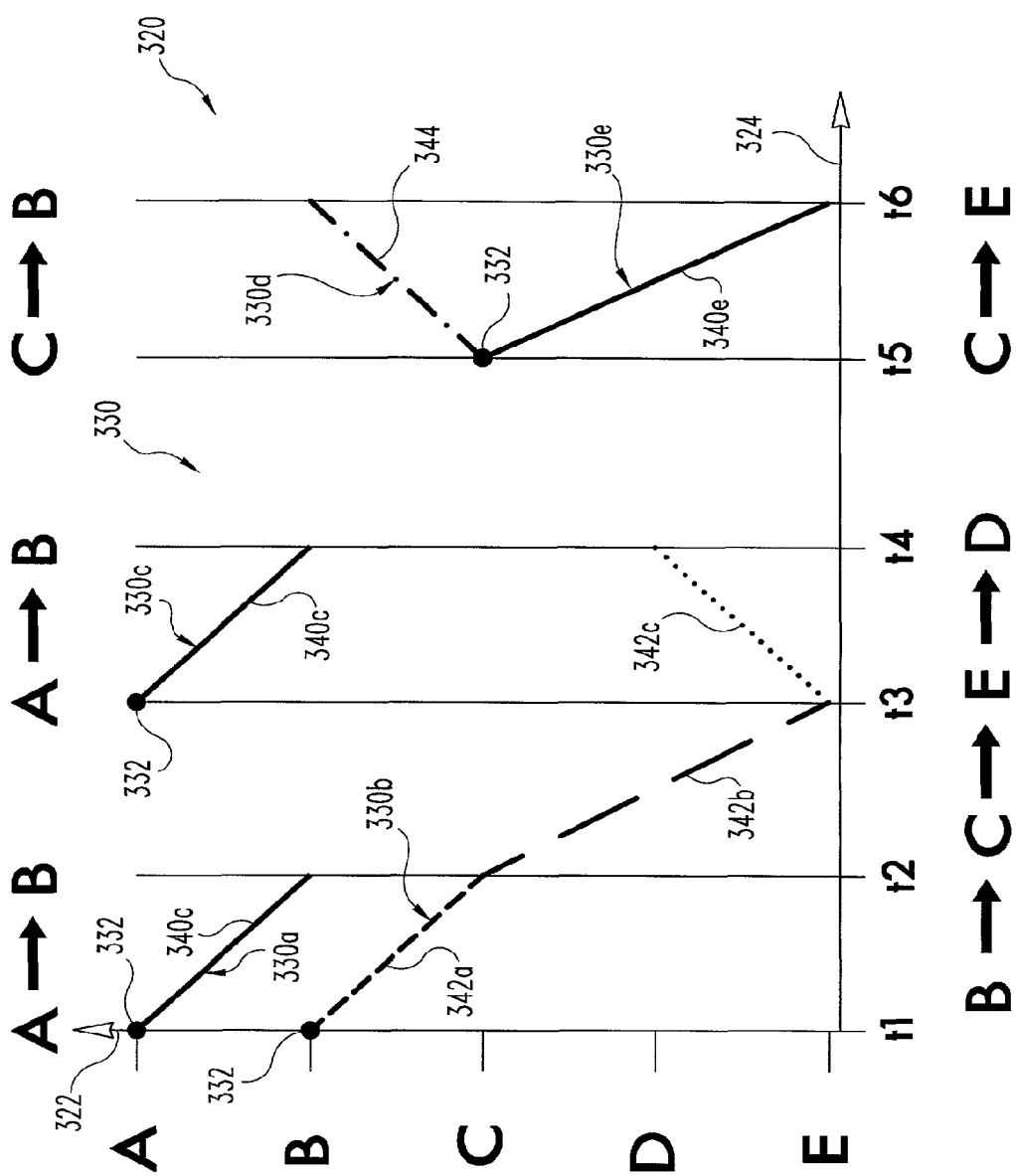
FIG. 6 is a view of a graphic sequential pattern visualization of the type that can be generated with the routine of FIG. 3.

In a further example, FIG. 6 provides visualization 320. In FIG. 6, the vertical axis 322 corresponds to a column of arbitrarily ordered topics {A, B, C, D, and E} generated with extraction engine 62. The horizontal axis 324 represents the progression of time from left to right in uniform time intervals "t" as indexed by t1, t2, t3, t4, t5 and t6 (t1-t6). Visualization 320 includes a number of line segments that are at oblique angles relative to axes 322 and 324. The occurrence of a given topic at a given time is represented as the endpoint of one of the line segments of visualization 320 with one coordinate of the endpoint being the given topic (one of A, B, C, D, and E) and the other coordinate of the endpoint being the time of occurrence of the given topic (one of t1, t2, t3, t4, t5, or t6). Accordingly, unique topic/time endpoints are plotted at a number of different locations along visualization 320. Vertical lines extend from the time of occurrence indicators to assist with visual alignment of the corresponding time intervals.

For visualization 320, each unique sequential pattern is represented by one or more of the oblique line segments connecting the two-coordinate topic/time locations of the pattern. A given oblique line segment connects two topics of the pattern that were recognized as being in sequence. Accordingly, two-topic patterns are each represented by one oblique line segment, three-topic patterns are each represented by two connected oblique line segments, four-topic patterns are each represented by three connected oblique line segments, and so on; such that the number of line segments is one less than the total number of topics in the sequential pattern represented by the segment(s).

Visualization 320 depicts five sequences 330a, 330b, 330c, 330d, and 330e (collectively designated sequential patterns 330) that correspond to A→B, B→C→E→D, A→B, C→B, and C→E, respectively. The beginning of each sequential pattern 330 represented by these oblique line segments is indicated by solid circular sequence start dot 332 at the two-coordinate location for the first topic/time endpoint. With increasing time from left to right along horizontal axis 324, each sequence start dot 332 corresponds to the leftmost endpoint of the sequence it represents. It should be understood that patterns 330d and 330e originate with the same dot 332 at the coordinates for the topic C and time t5 (C,t5).

The support level or strength of each two-element pattern or subpattern can be represented by different visual features. It has been found that the use of different colors for line segments of a different support value or strength can be informative as will be more fully described in connection with the visualizations of FIGS. 7 and 8; however, other indicators can be used to distinguish strength differences, such as line segment weight, line segment pattern, connecting segment symbols, and/or different indicators as would occur to those skilled in the art. These indicators can be used to specifically designate each different support level and/or represent membership of the given pattern in one of a predefined set of different support level ranges. For visualization 320, each of the two-topic sequences 330a, 330c, 330e comprise a single line segment 340a, 340c, 340e, respectively. The line segments 340a, 340c and 340e, all have the same support level or strength as indicated by a solid line pattern. For sequence 330b, which is a three-line segment pattern corresponding to B→C→E→D, line segments 342a, 342b, 342c, each have a different support level as represented by three differently arranged broken line patterns. For line segment 344 of sequence of 330d, yet a different corresponding support level is indicated by an alternating dot/line pattern.

Once generated, the visualization is examined in stage 162. The stage 162 examination can be performed by one or more parties interested in the particular sequential pattern knowledge being sought. Examples of applications of sequential pattern data mining and/or visualization in accordance with the present invention include, but are not limited to medical insurance claim analysis, bioinformatic analysis, genomic analysis, drug performance evaluations, military operational risk assessments, and marketing evaluations. Optionally, stage 162 can also include operator input selections to: present the visualization on display 26a and/or printer 26b; modify various parameters of the visualization (such as hide one or more patterns, change strength indicators, etc. . . . ); review extracted topic information underlying the visualization (with or without support values); and/or store extraction data or visualization information in memory 28.

For one form of visualization presented on display 26a, routine 120 provides a zoom-in/zoom-out capability via mouse 24a or another pointing device to support context and focus analysis.

From the examination of stage 162, routine 120 proceeds to conditional 164 to determine if adjustments to selected processing parameters are desired to further refine or redirect the operations in stages 122, 124, 130, and/or 160. If such changes are desired, the affirmative branch of conditional 164 leads to conditional 166. Conditional 166 tests if a new dataset is to be selected. If conditional 166 is true (affirmative), routine 120 returns to stage 122 via processing loop 170. If conditional 166 is not true (negative), routine 120 proceeds along loop 180 to stage 182. In stage 182, several selections are provided, including, for example: an option to choose/design a filter to select only a subset of the previously extracted topics and/or screen-out one or more unwanted topics from the previously processed dataset; an option to change the time-base resolution used to identify sequential patterns; an option to change the support threshold used to construct the sequential patterns; and/or an adjustment to visualization layout, colors, shapes, shading, or the like. It should be understood that conditionals 164 and 166, and stage 182 can be provided in the form of an interactive tool that is used to review and modify visualizations as desired. Correspondingly, this tool can further include the option to store, save, print, and/or transmit a visualization generated with routine 120 and/or to provide multiple visualizations for comparison. Also, it should be appreciated that routine 120 can be executed a number of times to obtain comparative results. Once conditional 164 is again encountered, and the determination is made not to continue, routine 120 terminates.

Figure 7:
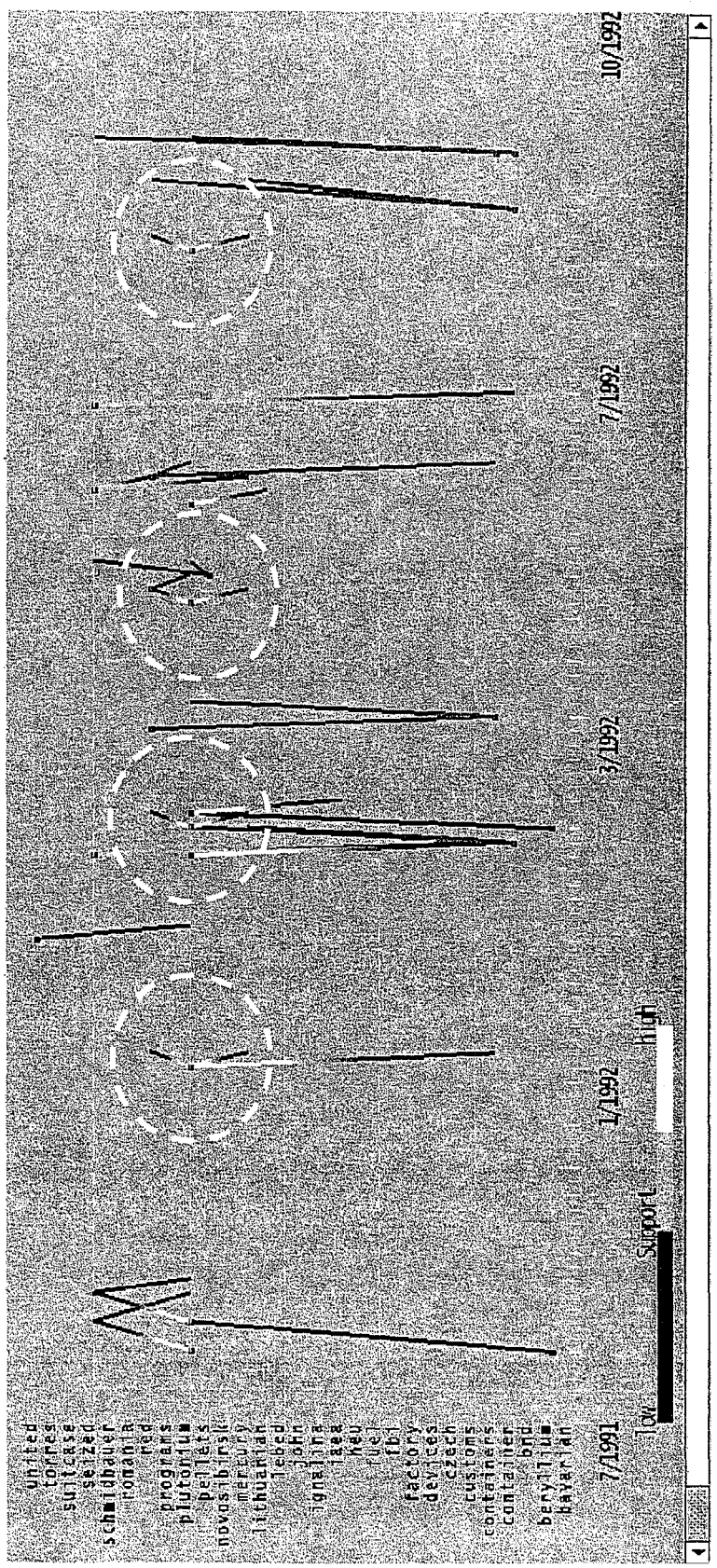
FIG. 7 is a view of a computer-generated, gray scale sequential pattern visualization for another data processing example.
Figure 8:
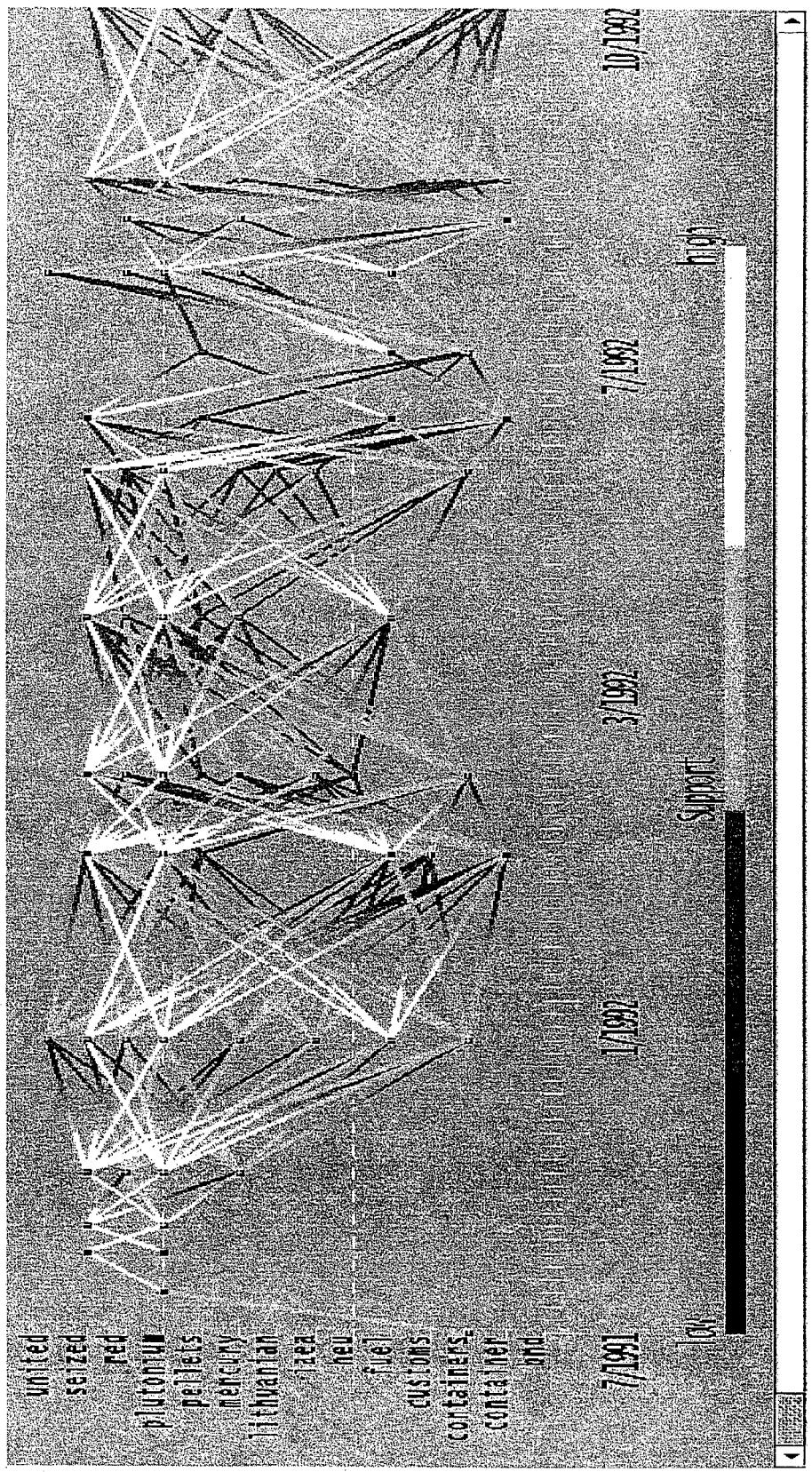
FIG. 8 is a view of a computer-generated, gray scale sequential pattern visualization, utilizing the same data as for the example of FIG. 7, but with a different time resolution and support threshold.

The visualization outputs presented in FIGS. 7 and 8 correspond to experiments that were conducted with the news corpus previously described. For these experiments, the topics of the corpus are binned into topic subsets. There are 766 daily bins, 76 monthly bins, and 7 yearly bins. The runtime parameters and statistics of the mining process are listed in Table 1 below. With proper pruning and realistic support thresholds, no problems were encountered processing the corpus on a standard SUN ULTRA 10; however, it should be understood that the routines of the present invention can be executed with any type computing arrangement in accordance with the present invention. In one such alternative, a Java-based system is utilized that can be executed on multiple platforms including PC, Mac, and/or UNIX, to name just a few.

TABLE 1

Runtime Statistics and Results

|  | Number of Bins | Support Threshold | Number of Patterns |
| --- | --- | --- | --- |
| Daily | 766 | 1% | 91 |
| Monthly | 76 | 10% | 444,617 |
| Monthly | 76 | 25% | 509 |
| Yearly | 7 | 45% | 148,667 |

It should also be appreciated that the data mining approach provides support information for all sequential patterns as well as their sub-patterns. Not only the strongest patterns can be studied, but also the weaker ones and those in between. This technique can compensate for the lack of support information of various conventional schemes.

For the visualization design of FIG. 7, extracted topics were listed on the left-hand side. The vertical axis represents the extracted topics of one time increment of the sequence and the horizontal axis represents the time progression from left to right in daily increments—corresponding to a daily resolution. The vertical alignment lines were not shown in FIG. 7 to preserve clarity; however, horizontal alignment lines are shown in FIG. 7 between every 5 topics. The oblique line segments of FIG. 7 each represent a two-topic sequence as described in connection with FIG. 6. Likewise, the topic/time location of the first topic for each sequence was marked by an enlarged dot at the leftmost end of the sequence representation. The experimental visualization used four basic colors— blue, red, yellow, and white—to show different levels of support values that were normalized for the visualization. For this experimental visualization, shading was turned on to blend the colors between two connected topics of the pattern. FIG. 7 presents the multicolor experimental visualization example in the form of a gray-scale, computer-generated image. For the FIG. 7 image, the darkest line segment shading corresponds to the lowest support level that was blue in the experimental example. The lightest line segment shading corresponds to the highest support level that was white in the experimental example. The intermediate shades of the line segments represent intermediate support levels with the darker shading corresponding to a lower support level than the lighter shading. These intermediate shades were generally red (darker) and yellow (lighter) for the multicolor experimental example.

The four dashed circles of FIG. 7 highlight the four appearances of the same two pattern sequences "plutonium→red" and "plutonium→mercury". These patterns came from the articles recorded right after the collapse of the former Soviet Union in 1992. Purportedly, western European officials frequently seized plutonium and a substance known as "red mercury" said to be smuggled from the former Soviet Union.

FIG. 8 depicts another multicolor, experimentally obtained visualization using the same corpus as FIG. 7 but with a few different parameters. FIG. 8 is a gray-scale, computer-generated form of the multicolor experimental example, having generally the same relationship between the line segment shading and support level as described for the visualization of FIG. 7. In contrast to FIG. 7, the topics of the articles for the FIG. 8 visualization are sequenced based on a monthly instead of daily resolution. This change in resolution can increase the number of sequential patterns in the visualization because, while there are now fewer bins (76), each bin has a lot more topics accumulated. In Table 1, it is shown that as many as 444K patterns can be obtained using a 10% support threshold. One way to clear up this visualization is to increase the threshold values. The number of patterns drops from 444K to less than 600 after the support threshold is increased from 10% to 25%. Accordingly, the visualization in FIG. 8 has a support threshold value of 25%.

FIG. 9 depicts an extracted topic selection pop-up window that was provided as another option of the experimental prototype. This window is of a Graphical User Interface (GUI) form that provides a topic query capability to select patterns with particular topics by checking the corresponding topic check box. In FIG. 9, all topics are shown checked in correspondence with the FIG. 8 visualization; however, by checking fewer boxes (and therefore fewer topics), a more selective sequential pattern display can be established. The selection window of FIG. 9 is one form in which various options of routine 120 can be presented.

With the graphical encoding of visualization, the sequential pattern mining approach is frequently enhanced with both spatial and temporal information that in turn help with the interpretation of the mining results. The addition of a graphical representation of statistics measures to reflect the support of a given sequential pattern enhances the ability to acquire meaningful knowledge from the data. In many applications, it is often desired to combine the statistical efforts of data mining with the human participation of visualization to achieve the ultimate goal of knowledge discovery.

Many other embodiments of the present invention are envisioned. For example, while the applications previously described are in terms of a text-based corpus, sequence patterns of other forms of data can be discovered and/or visualized in accordance with the teachings of the present invention. A further embodiment of the present invention is a method that includes providing a visual representation of a number of sequence patterns determined with a computer and displaying a number of visual indications each corresponding to a level of support for a respective one of the sequence patterns. In one form of this method, the sequence patterns are each presented as a line segment in the visual representation. Additionally or alternatively, the method can optionally include providing the indications as one of a number of different colors that each represent a different support level range.

Still another embodiment of the present invention includes a method for analyzing a computer-accessible dataset. This method comprises: extracting a number of different topics from the dataset with a computer; providing an arrangement of the different topics relative to time of occurrence with the computer; determining a number of sequential patterns from the arrangement with the computer; and providing an output corresponding to a graphical visualization of the sequential patterns with the computer. The method can further include changing a time resolution of the sequential patterns and/or support threshold. Alternatively or additionally, the sequential pattern determination can include iteratively building a number of trees each corresponding to a different one of the sequential patterns. For each sequential pattern, this building process can further include establishing a candidate pattern; calculating a value corresponding to support for each candidate pattern, and testing if the value meets a support threshold. The visualization can include an indication corresponding to support for each of the sequential patterns. The visualization can represent each sequential pattern as a line segment with line color serving as the indication.

In yet a further embodiment, a method of data mining sequential pattern information from a computer-accessible dataset includes: extracting a number of different topics from the dataset; establishing a number of two-topic sequence patterns with the computer; evaluating each of the two-topic patterns relative to a threshold with the computer; and establishing a plurality of three-topic sequence patterns as a function of the two-topic sequence patterns and the evaluation with the computer. In one form, this method can further include determining several four-topic sequence patterns as a function of the three-topic sequence patterns and an evaluation of the three-topic sequence patterns relative to the threshold. In another form, several sequence patterns are iteratively determined until all patterns complying with the threshold are discovered, and these patterns are presented in a graphic visualization with indicators corresponding to respective support levels.

Another embodiment includes a method of displaying data with a computer, comprising: determining a number of data pairs, a first member of each of the pairs representing one of a number of different topics and a second member of each of the pairs representing time; determining a number of display locations each corresponding to one of the pairs; grouping the locations into a number of different sets, each set corresponding to one of several sequential patterns; and providing a visualization output that joins adjacent locations within each of the different sets by one or more line segments to graphically depict the sequential patterns. The method can further include providing the visualization output with an indication corresponding to support level for each of the sequential patterns. This indication can be provided in the form of one of a number of different colors designating different support level ranges.

In further embodiments, any of the above-indicated methods are applied to one or more dataset types consisting of the group of: medical insurance claim data, bioinformatic data, genomic data, drug performance data, data relating to risk factors for military operations, and retail sales data. Still other embodiments include a system arranged to implement one or more of the above-indicated methods and/or a computer-readable apparatus encoded to include a number of programming instructions to execute one or more of the above-indicated methods. Yet a further embodiment includes a transmission medium, such as a computer network, carrying one or more signals to or from a computer, the signal being operable to communicate processor instructions corresponding to any of the above-indicated methods of the present invention.

In one further embodiment, a system comprises a computer-accessible dataset and one or more processors operable to: access the dataset, extract a number of different topics therefrom, arrange the different topics according to time of occurrence, determine one or more sequential patterns of the different topics, and generate an output corresponding to visualization of the sequential patterns. The system can further include one or more output devices responsive to the output to present the visualization, including a number of graphic features each representative of a different one of the sequential patterns. Alternatively or additionally, the one or more processors are operable to generate a visual representation of a number of sequence patterns determined from a computer-accessible dataset and display a number of visual indications each corresponding to a level of support for a different one of the sequence patterns. In still another alternative or additional form, the one or more processors are operable to extract a number of different topics from a computer-accessible dataset, establish a number of two-topic sequence patterns, evaluate each of the two-topic patterns relative to a threshold, and provide a plurality of three-topic sequence patterns as a function of the two-topic sequence patterns and the evaluation. In yet a further alternative or additional form, the one or more processors are operable to: determine a number of data pairs each including a first member representing one of a number of different topics and a second member representing time; determine a number of display locations each corresponding to one of the pairs; group the locations into a number of different sets each corresponding to one of several sequential patterns; and provide a visualization output that joins adjacent locations within each of the different sets by one or more line segments to graphically depict the sequential patterns.

This system can further comprise one or more input devices. For this form, the one or more processors respond to the input to change one or more designated processing parameters, such as the dataset to be processed, the time-based resolution of data processing, and/or a support threshold used to evaluate the sequential patterns. The system can be coupled to one or more datasets or computers by a computer network, such as the Internet.

Yet a further embodiment comprises a transmission medium carrying one or more signals to provide a number of processor executable instructions operable to generate a visual representation of a number of sequence patterns determined from a computer-accessible dataset and display a number of visual indications each corresponding to a level of support for a different one of the sequence patterns of the visual representation. Alternatively or additionally, the instructions are operable to extract a number of different topics from a computer-accessible dataset, provide an arrangement of the different topics relative to time of occurrence, determine a number of sequential patterns from the arrangement, and provide an output corresponding to a graphical visualization of the sequential patterns. In a further alternative or additional form, the instructions are operable to extract a number of different topics from a computer-accessible dataset, establish a number of two-topic sequence patterns, evaluate each of the two-topic patterns relative to a threshold, and provide a plurality of three-topic sequence patterns as a function of the two-topic sequence patterns and the evaluation. In yet a further alternative or additional form, the instructions are operable to: determine a number of data pairs each including a first member representing one of a number of different topics and a second member representing time; determine a number of display locations each corresponding to one of the pairs; group the locations into a number of different sets each corresponding to one of several sequential patterns; and provide a visualization output that joins adjacent locations within each of the different sets by one or more line segments to graphically depict the sequential patterns. The transmission medium can include a computer network.

Another embodiment comprises a computer-readable apparatus encoded with a number of processor executable instructions operable to generate a visual representation of a number of sequence patterns determined from a computer-accessible dataset and display a number of visual indications each corresponding to a level of support for a different one of the sequence patterns of the visual representation. Alternatively or additionally, the instructions are operable to extract a number of different topics from a computer-accessible dataset, provide an arrangement of the different topics relative to time of occurrence, determine a number of sequential patterns from the arrangement, and provide an output corresponding to a graphical visualization of the sequential patterns. In a further alternative or additional form, the instructions are operable to extract a number of different topics from a computer-accessible dataset, establish a number of two-topic sequence patterns, evaluate each of the two-topic patterns relative to a threshold, and provide a plurality of three-topic sequence patterns as a function of the two-topic sequence patterns and the evaluation. In yet a further alternative or additional form, the instructions are operable to: determine a number of data pairs each including a first member representing one of a number of different topics and a second member representing time; determine a number of display locations each corresponding to one of the pairs; group the locations into a number of different sets each corresponding to one of several sequential patterns; and provide a visualization output that joins adjacent locations within each of the different sets by one or more line segments to graphically depict the sequential patterns. The apparatus can be in the form of a removable and/or portable memory device.

In other embodiments of the above-identified systems, apparatus, and methods of the present invention, a pixel-based visualization design is utilized to increase display volume and/or visualization is utilized to enhance the topic-matching or tree-pruning algorithm of the sequential pattern mining process. In another embodiment, the techniques for processing association rules described in Pak Chung Wong, Paul Whitney, and Jim Thomas; "Visualizing Association Rules for Text Mining," *Proceedings of IEEE Information Visualization '99*, Los Alamitos, Calif., (IEEE CS Press) (dated Oct. 26, 1999) are integrated with any of the above-identified methods, systems, or apparatus of the present invention into a visual data mining environment that provides navigation, association and implication analysis, time sequence analysis, hypothesis explanation, and/or document summarization.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions described herein or defined by the following claims are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

What is claimed is:

1. A computer implemented method, comprising:
    generating a visualization with a said computer representative of several event sequences occurring at different points in time;
    displaying one of the event sequences more than once in the visualization to correspondingly represent occurrences of the one of the event sequences at different times; and
    displaying three or more of the event sequences that overlap in time in the visualization.

2. The method of claim 1, which further includes displaying another of the event sequences more than once in the visualization to correspondingly represent different occurrences.

3. The method of claim 1, wherein said generating includes:
    determining a number of display locations each representing one of a number of different event identifiers and a corresponding time;
    grouping the display locations into a number of different sets, the different sets each corresponding to a different one of the event sequences.

4. The method of claim 3, wherein said generating includes visually connecting the display locations within each of the different sets with a corresponding number of line segments to depict the event sequences and providing line segment coloration to depict support level.

5. A system, comprising:
    one or more processors operable to selectively access a computer-accessible dataset and extract a number of different event identifiers therefrom, said one or more processors being further operable to determine a number of display locations each representative of one of the different event identifiers and a corresponding time, group the display locations into a number of sets each corresponding to a different one of several event sequences, and generate an output corresponding to a visualization of the event sequences; and
    one or more output devices responsive to the output to present the visualization, the visualization including a number of graphic features to indicate the display locations within each of the sets as belonging to a corresponding one of the event sequences.

6. The system of claim 5, wherein the one or more processors are further operable to determine a number of visual indications each corresponding to a level of support for a different one of the event sequences.

7. The system of claim 5, further comprising one or more input devices operatively coupled to said one or more processors, said one or more processors being responsive to said one or more input devices to select a support threshold for identifying the event sequences.

8. The system of claim 5, wherein the one or more output devices include a color graphic display.

9. The system of claim 5, further comprising means for selecting the display locations as a function of sequence support level.

10. An apparatus, comprising: a processor and a non-transitory computer-accessible storage medium carrying a number of processor executable instructions operable to generate a visualization of several event sequences occurring at different points in time determined from a computer-accessible dataset, display three or more of the event sequences overlapping in time in the visualization, and display one of the event sequences more than once in the visualization to correspondingly represent occurrences of the one of the event sequences at different times.

11. The apparatus of claim 10, wherein the instructions are further operable to display another of the event sequences more than once in the visualization to represent multiple occurrences.

12. The apparatus of claim 10, wherein the medium includes a computer memory.

13. The apparatus of claim 10, wherein the medium includes a computer network.

* * * * *